United States Patent
Lee et al.

(10) Patent No.: US 9,685,130 B2
(45) Date of Patent: Jun. 20, 2017

(54) DISPLAY DEVICE

(71) Applicant: SAMSUNG DISPLAY CO., LTD., Yongin, Gyeonggi-Do (KR)

(72) Inventors: Seung Kyu Lee, Cheonan-si (KR); Woo Sung Sohn, Seoul (KR); Yong Tae Cho, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 388 days.

(21) Appl. No.: 14/219,433

(22) Filed: Mar. 19, 2014

(65) Prior Publication Data

US 2015/0154932 A1 Jun. 4, 2015

(30) Foreign Application Priority Data

Dec. 4, 2013 (KR) .................. 10-2013-0150010

(51) Int. Cl.
*G02F 1/136* (2006.01)
*G09G 3/36* (2006.01)
*G02F 1/1362* (2006.01)
*G02F 1/1368* (2006.01)

(52) U.S. Cl.
CPC ......... *G09G 3/3655* (2013.01); *G02F 1/1368* (2013.01); *G02F 1/13624* (2013.01); *G02F 1/136286* (2013.01); *G02F 2001/136245* (2013.01); *G09G 3/3614* (2013.01); *G09G 2300/043* (2013.01); *G09G 2300/0823* (2013.01)

(58) Field of Classification Search
CPC ................ G02F 1/13624; G02F 2001/136245
See application file for complete search history.

(56) References Cited

U.S. PATENT DOCUMENTS 8,149,344 B2 4/2012 Kao
2013/0088418 A1* 4/2013 Kim .................. H04N 13/0434
345/92

FOREIGN PATENT DOCUMENTS

| JP | 2008-304684 | 12/2008 |
|----|---|---|
| KR | 1020000056609 | 9/2000 |
| KR | 1020020091699 | 12/2002 |
| KR | 1020070077350 | 7/2007 |
| KR | 1020120000333 | 1/2012 |

OTHER PUBLICATIONS

Translation of KR20070077350, Jul. 2007.*

* cited by examiner

*Primary Examiner* — Phu Vu
(74) *Attorney, Agent, or Firm* — F. Chau & Associates, LLC

(57) ABSTRACT

A display device includes a substrate, a gate line connected to a gate driver, a reference voltage line, a data line crossing the gate line and the reference voltage line, a first thin film transistor including a first drain electrode and connected to the gate line and the data line, a second thin film transistor including a second drain electrode, a third thin film transistor connected to the gate line, the reference voltage line, and the second thin film transistor, and a pixel electrode including a first sub-pixel electrode connected to the first thin film transistor and a second sub-pixel electrode connected to the second thin film transistor. The first drain electrode overlaps the reference voltage line, and an area of a region in which the first drain electrode and the reference voltage line overlap each other increases in a direction toward the gate driver.

14 Claims, 13 Drawing Sheets

DISPLAY DEVICE

CROSS-REFERENCE TO RELATED APPLICATIONS

This application claims priority under 35 U.S.C. §119 to Korean Patent Application No. 10-2013-0150010 filed on Dec. 4, 2013, the disclosure of which is incorporated by reference herein in its entirety.

TECHNICAL FIELD

The present invention relates to a display device.

DISCUSSION OF THE RELATED ART

A display device is a device that visually displays data. The display device may be, for example, a liquid crystal display, an electrophoretic display, an organic light emitting display, an inorganic EL (electro luminescent) display, a field emission display, a surface-conduction electron-emitter display, a plasma display, or a cathode ray display.

A liquid crystal display includes two display substrates on which electric field generating electrodes, such as a pixel electrode and a common electrode, are formed, and a liquid crystal layer disposed between the electric field generating electrodes. An electric field is generated by applying a voltage to the electric field generating electrodes, alignment of liquid crystal molecules of the liquid crystal layer is determined by the generated electric field, and polarization of an incident light is controlled to display an image.

SUMMARY

To improve the display quality of a low-gradation image and to reduce power consumption, both sub-pixels in a pair of sub-pixels may operate in the case of displaying a high-gradation image, and only one sub-pixel in the pair of sub-pixels may operate in the case of displaying a low-gradation image. For example, if it is assumed that a sub-pixel to which a relatively high voltage is applied is a first sub-pixel and a sub-pixel to which a relatively low voltage is applied is a second sub-pixel, both the first sub-pixel and the second sub-pixel may operate when a high-gradation image is displayed, and only the first sub-pixel may operate when a low-gradation image is displayed.

However, when using this method, it may be difficult to set a common voltage. For example, in the case of displaying a high-gradation image, both the first sub-pixel and the second sub-pixel may cause a kickback voltage to be heightened, and as a result, the optimum common voltage may be lowered. In contrast, in the case of displaying a low-gradation image, only the first sub-pixel may cause the kickback voltage to be lowered, and as a result, the optimum common voltage may be heightened.

In this case, if the common voltage is set based on the case in which a low-gradation image is displayed, asymmetry between positive polarity and negative polarity may be increased when the high-gradation image is displayed, and display defects such as, for example, ghosting and crosstalk may occur. Thus, the common voltage may be set based on the case in which a high-gradation image is displayed. That is, the common voltage may be set to be lower than the optimum common voltage when the low-gradation image is displayed.

However, if the common voltage is set to a low value, luminance of a center portion of a pixel region of the display device may become heightened due to delay phenomenon of a gate signal. That is, a difference in luminance may occur between an edge portion and the center portion of the pixel region of the display device.

According to exemplary embodiments of the present invention, a display device which can reduce a difference in luminance between an edge portion and a center portion of a pixel region is provided.

According to an exemplary embodiment of the present invention, a display device includes a first substrate, a gate line disposed on the first substrate and connected to a gate driver, a reference voltage line disposed on the first substrate, a data line disposed on the first substrate and crossing the gate line and the reference voltage line, a first thin film transistor connected to the gate line and the data line and including a first drain electrode, a second thin film transistor including a second drain electrode, a third thin film transistor connected to the gate line, the reference voltage line, and the second thin film transistor, and a pixel electrode including a first sub-pixel electrode connected to the first thin film transistor and a second sub-pixel electrode connected to the second thin film transistor. The first drain electrode overlaps the reference voltage line, and an area of a region in which the first drain electrode and the reference voltage line overlap each other is increased as going in a direction toward the gate driver.

The second drain electrode may overlap the reference voltage line, and the area of the region in which the first drain electrode and the reference voltage line overlap each other may be about equal to or larger than an area of a region in which the second drain electrode and the reference voltage line overlap each other.

The area of the region in which the second drain electrode and the reference voltage line overlap each other may be constant on an entire surface of the first substrate.

The second drain electrode may overlap the reference voltage line, and a difference between the area of the region in which the first drain electrode and the reference voltage line overlap each other and an area of a region in which the second drain electrode and the reference voltage line overlap each other may be increased as going in the direction toward the gate driver.

The first drain electrode may include a first drain extension portion that overlaps the reference voltage line. The first drain extension portion may include a projection extension portion, and a length of the projection extension portion may be increased as going in the direction toward the gate driver.

The second drain electrode may include a second drain extension portion that overlaps the reference voltage line, and the second drain extension portion may have the same shape on an entire surface of the first substrate.

The gate line and the reference voltage line may be disposed on the same plane.

An output terminal of the second thin film transistor may be connected to the second sub-pixel electrode and an input terminal of the third thin film transistor.

A voltage that is applied to the second sub-pixel electrode may be lower than a voltage that is applied to the first sub-pixel electrode.

An area of the second sub-pixel electrode may be about equal to or larger than an area of the first sub-pixel electrode.

The first sub-pixel electrode and the second sub-pixel electrode may include a cross trunk portion including a horizontal trunk portion and a vertical trunk portion that crosses the horizontal trunk portion, and a plurality of fine branch portions extending from the cross trunk portion.

The display device may further include a second substrate that faces the first substrate, and a liquid crystal layer interposed between the first substrate and the second substrate.

According to an exemplary embodiment of the present invention, a display device includes a substrate, a gate line disposed on the substrate and configured to receive a gate signal applied from a gate driver, a reference voltage line disposed on the substrate and spaced apart from the gate line, a data line disposed on the substrate, configured to receive a data signal applied from a data driver, and crossing the gate line and the reference voltage line, a first thin film transistor and a second thin film transistor connected to the gate line and the data line, a third thin film transistor connected to the gate line, the reference voltage line, and the second thin film transistor, and a pixel electrode including a first sub-pixel electrode connected to the first thin film transistor and a second sub-pixel electrode connected to the second thin film transistor. The first sub-pixel electrode overlaps the reference voltage line, and an area of a region in which the first sub-pixel electrode and the reference voltage line overlap each other is increased as going in a direction toward the gate driver.

The reference voltage line may include a holding extension portion that overlaps an edge portion of the first sub-pixel electrode, and a length of the holding extension portion may be increased as going in the direction toward the gate driver.

According to an exemplary embodiment of the present invention, a display device includes a substrate, and at least one pixel disposed on the substrate. The at least one pixel includes a first sub-pixel and a second sub-pixel to which a voltage that is lower than a voltage of the first sub-pixel is applied, the first sub-pixel includes a first holding capacitor, and a capacitance of the first holding capacitor is increased as going to one edge portion of the substrate.

The capacitance of the first holding capacitor may be lowest in a center portion of the substrate.

The capacitance of the first holding capacitor may be lowest in another edge portion of the substrate that faces the one edge portion.

The display device may further include a gate driver applying a gate signal to the first sub-pixel and the second sub-pixel. The gate driver may be disposed at the one edge portion of the substrate.

The second sub-pixel may include a second holding capacitor. The capacitance of the first holding capacitor may be about equal to or higher than a capacitance of the second holding capacitor.

The capacitance of the second holding capacitor may be constant on an entire surface of the substrate.

According to exemplary embodiments of the present invention, the difference in luminance between the edge portion and the center portion of the pixel region of the display device may be reduced.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
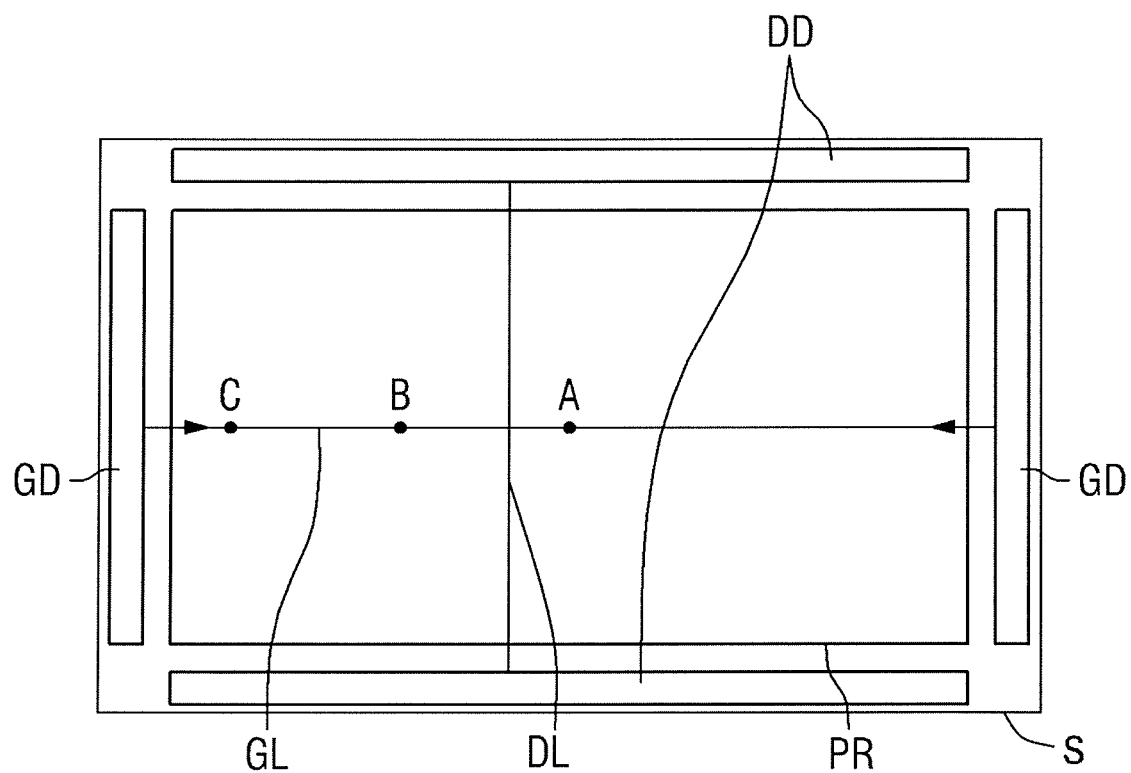
FIG. 1 is a schematic plan view of a display device according to an exemplary embodiment of the present invention.

Exemplary embodiments of the present invention will be described more fully hereinafter with reference to the accompanying drawings. Like reference numerals may refer to like elements throughout the accompanying drawings.

It will be understood that when an element or layer is referred to as being "on," or "connected to" another element or layer, it can be directly on or connected to the other element or layer, or intervening elements or layers may be present.

Spatially relative terms, such as "below," "beneath," "lower," "above," "upper," etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

A display device is a device that displays an image. A display device may be, for example, a liquid crystal display, an electrophoretic display, an organic light emitting display, an inorganic EL (electro luminescent) display, a field emission display, a surface-conduction electron-emitter display, a plasma display, or a cathode ray display.

Hereinafter, exemplary embodiments of the present invention include a liquid crystal display. However, the display device according to the present invention is not limited thereto, and various types of display devices may be used according to exemplary embodiments.

FIG. 1 is a schematic plan view of a display device according to an exemplary embodiment of the present invention.

Referring to FIG. 1, a display device according to an exemplary embodiment includes a substrate S, a pixel region PR, a gate driver GD, a gate line GL, a data driver DD, and a data line DL.

The substrate S may be, for example, an insulating substrate. The substrate S may be, for example, a rigid substrate or a flexible substrate.

The pixel region PR is positioned on the substrate S, and includes a plurality of pixels. As shown in FIG. 1, the pixel region PR may have a rectangular shape, however the shape of the pixel region PR is not limited thereto. For example, the pixel region PR may have a circular shape or a polygonal shape.

The pixel region PR may include regions A, B, and C. Region A corresponds to a substantially center portion of the pixel region PR or the substrate S, and may also correspond to a region that is farthest apart from the gate driver GD on the pixel region PR or the substrate S. Region C corresponds to an edge portion of the pixel region PR or the substrate S, is a region that is closest to (e.g., most adjacent to) the gate driver GD on the pixel region PR or the substrate S. Region B is a region that is positioned between region A and region C. The pixels positioned on regions A, B, and C will be described below.

The gate driver GD generates and transmits a gate signal to the gate line GL. In an exemplary embodiment, the gate driver GD may be positioned at both end portions of the pixel region PR. As shown in FIG. 1, the gate driver GD may be positioned at shorter sides of the pixel region PR, however the location of the gate driver GD is not limited thereto. For example, in an exemplary embodiment, the gate driver GD may be positioned at longer sides of the pixel region PR. In an exemplary embodiment, the gate driver GD may be positioned at only one end portion of the pixel region PR.

The gate line GL is connected to the gate driver GD and passes through the pixel region PR. In an exemplary embodiment, the gate line GL may cross the pixel region PR in a substantially horizontal direction. The gate line GL may apply the gate signal to a plurality of pixels positioned in the pixel region PR.

The data driver DD generates and transmits a data signal to the data line DL. In an exemplary embodiment, the data driver DD may be positioned at both end portions of the pixel region PR at which the gate driver GD is not positioned. As shown in FIG. 1, the data driver DD may be positioned at the longer sides of the pixel region PR, however the location of the data driver DD is not limited thereto. For example, in an exemplary embodiment, the data driver DD may be positioned at the shorter sides of the pixel region PR. In an exemplary embodiment, the data driver DD may be positioned at only one end portion of the pixel region PR at which the gate driver GD is not positioned.

The data line DL is connected to the data driver DD and passes through the pixel region PR. In an exemplary embodiment, the data line DL may cross the pixel region PR in a substantially vertical direction. The data line DL may apply the data signal to a plurality of pixels positioned in the pixel region PR.

Figure 2:
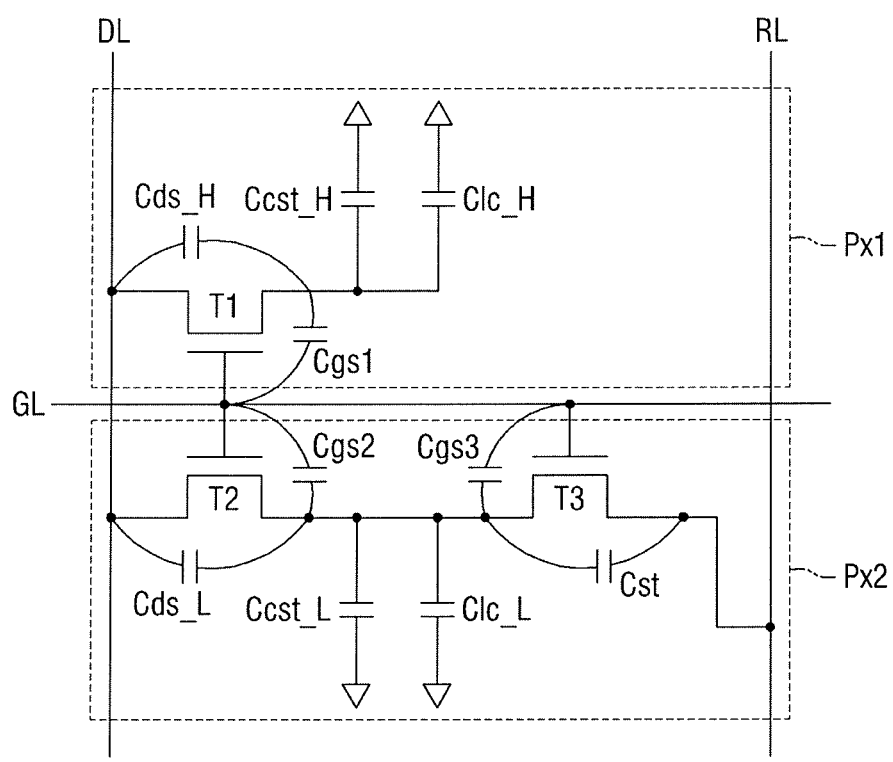
FIG. 2 is an equivalent circuit diagram of one pixel positioned in a pixel region of the display device of FIG. 1, according to an exemplary embodiment of the present invention.
Figure 3:
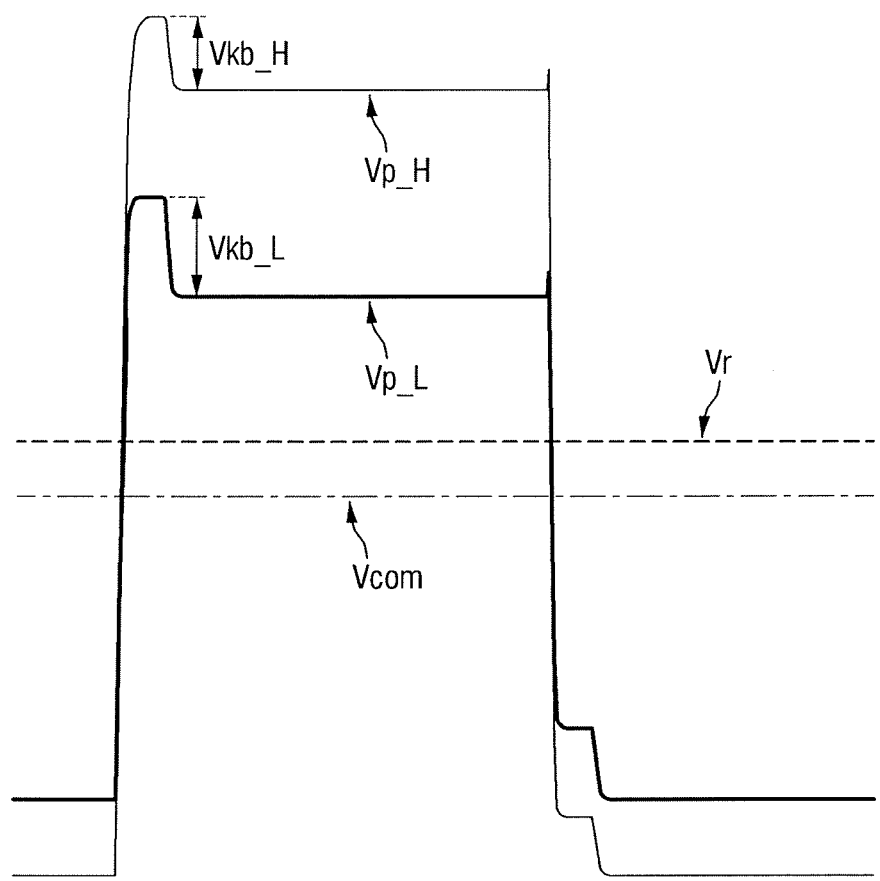
FIG. 3 is a waveform diagram of signals applied to the pixel of FIG. 2, according to an exemplary embodiment of the present invention.

Hereinafter, one pixel that is positioned in the pixel region PR of the display device of FIG. 1 will be described in detail with reference to FIGS. 2 and 3. FIGS. 2 and 3 show the contents which are common to the pixels positioned in regions A, B, and C of the display device of FIG. 1. FIG. 2 is an equivalent circuit diagram of one pixel positioned in the pixel region PR of the display device of FIG. 1. FIG. 3 is a waveform diagram of signals applied to the one pixel of FIG. 2.

Referring to FIG. 2, one pixel of the display device according to an exemplary embodiment of the present invention may include two sub-pixels Px1 and Px2. Further, one pixel of the display device according to an exemplary embodiment may include a plurality of signal lines, which include a gate line GL for transmitting a gate signal, a data line DL for transmitting a data signal, and a reference voltage line RL for transmitting a divided reference voltage, and first to third thin film transistors (TFTs) T1, T2, and T3, first and second holding capacitors Ccst_H and Ccst_L, and first and second liquid crystal capacitors Clc_H and Clc_L, which are connected to the plurality of signal lines. Further, one pixel of the display device according to an exemplary embodiment may include a plurality of parasitic capacitors Cgs1, Cgs2, Cgs3, Cds_H, Cds_L, and Cst.

The first sub-pixel Px1 may be positioned on one side of the gate line GL, and the second sub-pixel Px2 may be positioned on the other side of the gate line GL. A relatively high voltage may be applied to a first sub-pixel electrode that is positioned in the first sub-pixel Px1 in comparison to a second sub-pixel electrode that is positioned in the second sub-pixel Px2.

Each of the first and second thin film transistors T1 and T2 is connected to the gate line GL and the data line DL, and the third thin film transistor T3 is connected to an output terminal of the second thin film transistor T2, the gate line GL, and the reference voltage line RL. The first thin film transistor T1 may be included in the first sub-pixel Px1, and the second and third thin film transistors T2 and T3 may be included in the second sub-pixel Px2.

Each of the first and second thin film transistor T1 and T2 is a three-terminal device. A control terminal thereof is connected to the gate line GL, and an input terminal thereof is connected to the data line DL. An output terminal of the first thin film transistor T1 is connected to the first holding capacitor Ccst_H and the first liquid crystal capacitor Clc_H, and an output terminal of the second thin film transistor T2 is connected to the second holding capacitor Ccst_L, the second liquid crystal capacitor Clc_L, and an input terminal of the third thin film transistor T3. The first holding capacitor Ccst_H and the first liquid crystal capacitor Clc_H may be included in the first sub-pixel Px1, and the second holding capacitor Ccst_L and the second liquid crystal capacitor Clc_L may be included in the second sub-pixel Px2.

The third thin film transistor T3 is also a three-terminal device. The control terminal thereof is connected to the gate line GL, the input terminal thereof is connected to the second liquid crystal capacitor Clc_L, and the output terminal thereof is connected to the reference voltage line RL.

Among the plurality of parasitic capacitors Cgs1, Cgs2, Cgs3, Cds_H, Cds_L, and Cst, Cgs1 is formed between the gate line GL and the output terminal of the first thin film transistor T1, Cgs2 is formed between the gate line GL and the output terminal of the second thin film transistor T2, and Cgs3 is formed between the gate line GL and the output terminal of the third thin film transistor T3. Further, Cds_H is formed between the data line DL and the output terminal of the first thin film transistor T1, Cds_L is formed between the data line DL and the output terminal of the second thin film transistor T2, and Cst is formed between the input terminal and the output terminal of the third thin film transistor T3.

Referring to FIG. 3, when a gate-on signal Von is applied to the gate line GL, the first to third thin film transistors T1 to T3, which are connected to the gate line GL, are turned on. Accordingly, a data voltage that is applied to the data line DL is applied to the first and second sub-pixel electrodes through the first and second thin film transistors T1 and T2, respectively. At this time, the data voltages applied to the first and second sub-pixel electrodes are equal to each other, and the first and second liquid crystal capacitors Clc_H and Clc_L are charged with the same value which corresponds to the difference between the common voltage Vcom and the data voltage. At the same time, the voltage that is charged in the second liquid crystal capacitor Clc_L is divided through the third thin film transistor T3 that is turned on. Through this, the voltage value charged in the second liquid crystal capacitor Clc_L is lowered by the difference between the common voltage Clc_H and the reference voltage Vr. That is, the voltage Vp_H that is charged in the first liquid crystal capacitor Clc_H becomes higher than the voltage Vp_L that is charged in the second liquid crystal capacitor Clc_L.

As described above, the voltage charged in the first liquid crystal capacitor Clc_H and the voltage charged in the second liquid crystal capacitor Clc_L are different from each other. Since the voltages of the first and second liquid crystal capacitors Clc_H and Clc_L are different from each other, tilting angles of the liquid crystal molecules in the first sub-pixel Px1 and the second sub-pixel Px2 are different from each other, and thus, the luminance of the first sub-pixel Px1 becomes different from the luminance of the second sub-pixel Px2. Accordingly, through proper adjustment of the voltage of the first liquid crystal capacitor Clc_H and the voltage of the second liquid crystal capacitor Clc_L, the view of an image from the side becomes closer to the view of an image from the front, and the viewing angle of the display device may be improved. In an exemplary embodiment, the level of the reference voltage Vr is higher than the level of the common voltage Vcom, and the difference between their absolute values is about 1V to about 4V. For example, if the common voltage Vcom is about 7V, the reference voltage Vr is about 8V to about 11V.

Hereinafter, different points between pixels that are positioned in regions A, B, and C of the display device of FIG. 1 will be described in detail.

Figure 4:
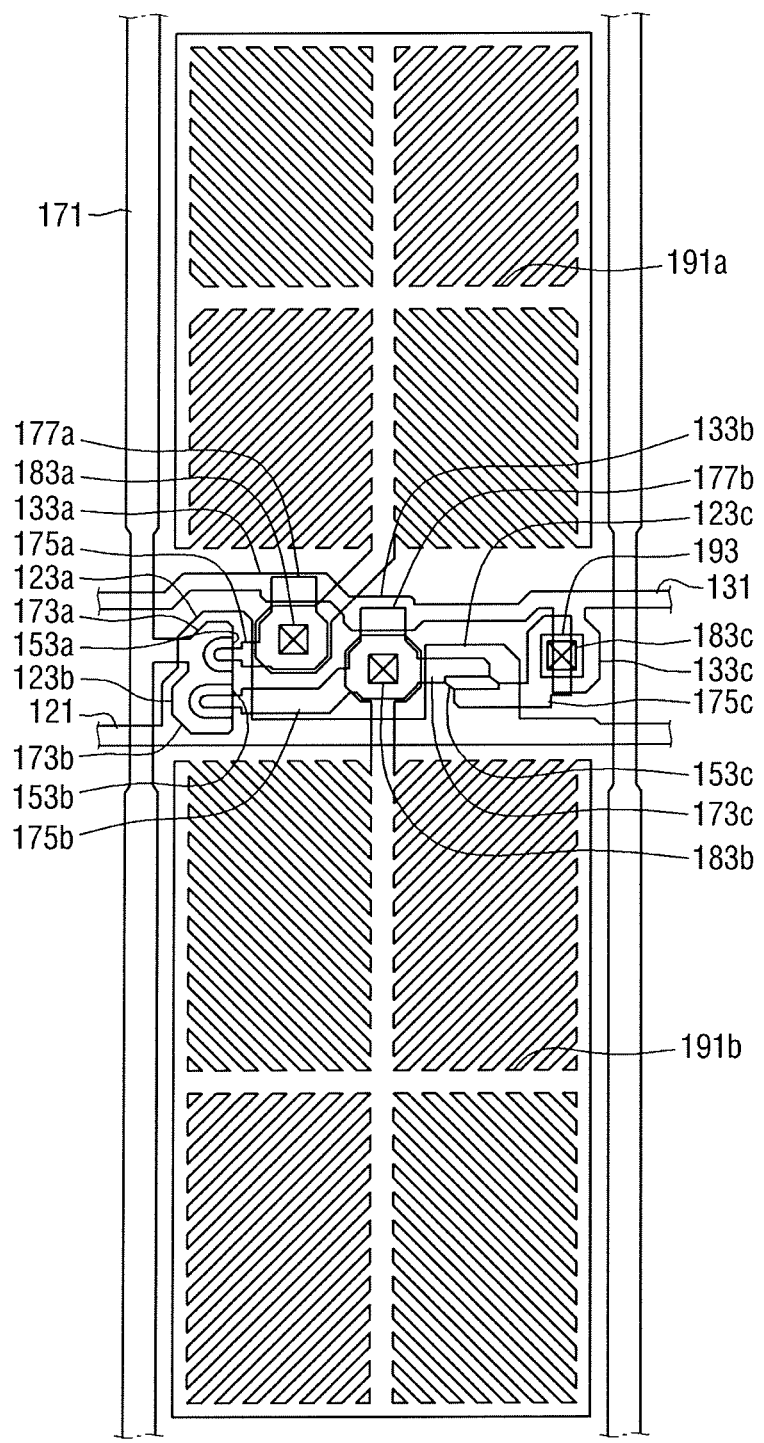
FIG. 4 is a plan view of one pixel positioned in region A of the display device of FIG. 1, according to an exemplary embodiment of the present invention.
Figure 5:
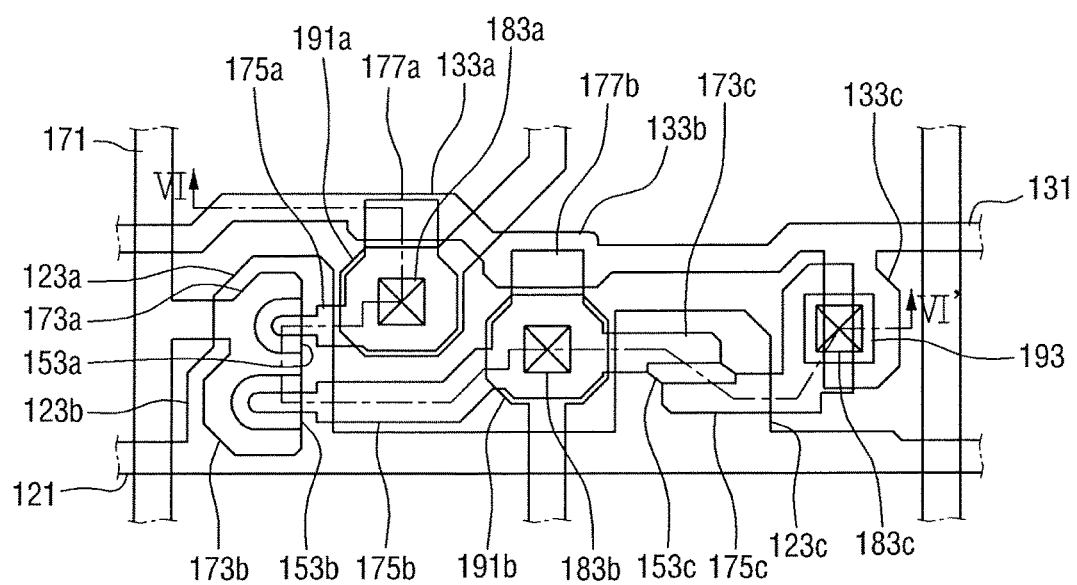
FIG. 5 is an enlarged plan view of a thin film transistor region of the pixel of FIG. 4, according to an exemplary embodiment of the present invention.
Figure 6:
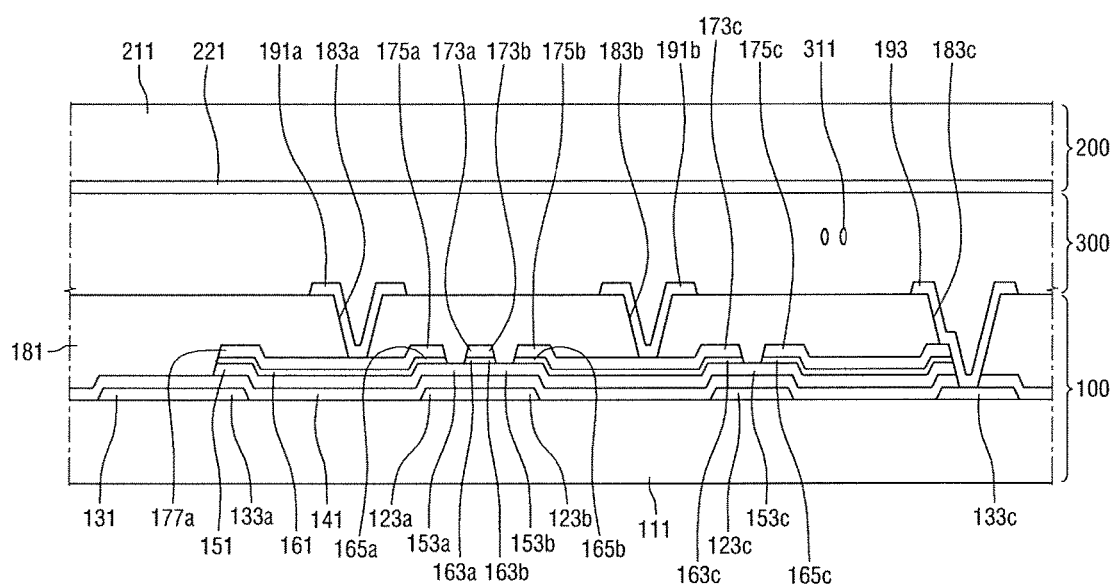
FIG. 6 is a cross-sectional view taken along line VI-VI' of FIG. 5, according to an exemplary embodiment of the present invention.

First, one pixel that is positioned in region A of the display device of FIG. 1 will be described in detail. FIG. 4 is a plan view of one pixel positioned in region A of the display device of FIG. 1. FIG. 5 is an enlarged plan view of a thin film transistor region of the pixel of FIG. 4. FIG. 6 is a cross-sectional view taken along line VI-VI' of FIG. 5.

Referring to FIGS. 4 to 6, a display device according to an exemplary embodiment of the present invention includes a lower display substrate 100 and an upper display substrate 200, which face each other, a liquid crystal layer 300 interposed between the lower display substrate 100 and the upper display substrate 200, and a pair of polarizers attached to outer surfaces of the lower display substrate 100 and the upper display substrate 200.

First, the lower display substrate 100 will be described.

A gate conductor, which includes a gate line 121 and a reference voltage line 131, is formed on a first substrate 111 that is made of, for example, transparent glass or plastic.

The gate line 121 includes a first gate electrode 123a, a second gate electrode 123b, a third gate electrode 123c, and a wide end portion connecting to another layer or an external driving circuit.

The reference voltage line 131 includes a first holding electrode 133a, a second holding electrode 133b, and a reference electrode 133c.

A gate insulating film 141 is formed on the gate line 121 and the reference voltage line 131.

A semiconductor layer 151 is formed on the gate insulating film 141. The semiconductor layer 151 may include a first semiconductor pattern 153a, a second semiconductor pattern 153b, and a third semiconductor pattern 153c.

A plurality of ohmic contact members 161 are formed on the semiconductor layer 151. The plurality of ohmic contact members 161 may include source ohmic contact members 163a, 163b, and 163c, which are positioned on lower portions of first to third source electrodes 173a, 173b, and 173c to be described later, and drain ohmic contact members 165a, 165b, and 165c, which are positioned on lower portions of first to third drain electrodes 175a, 175b, and 175c.

On the ohmic contact member 161 and the gate insulating film 141, a data line 171, which includes the first source electrode 173a and the second source electrode 173b, and a data conductor, which includes the first drain electrode 175a, the second drain electrode 175b, the third source electrode 173c, and the third drain electrode 175c, are formed.

The first drain electrode 175a may include a first drain extension portion 177a, and the first drain extension portion 177a of the second drain electrode 175b may overlap the second holding electrode 133b of the reference voltage line 131. Since the first drain extension portion 177a and the first holding electrode 133a overlap each other, the first holding capacitor Ccst_H may be formed.

An overlapping area between the first drain extension portion 177a and the first holding electrode 133a may be substantially the same as an overlapping area between the second drain extension portion 177b and the second holding electrode 133b.

The data conductor, the semiconductor layer 151 arranged below the data conductor, and the ohmic contact member 161 may be simultaneously formed using one mask.

The data line 171 includes the wide end portion connecting to another layer or the external driving circuit.

The first gate electrode 123a, the first source electrode 173a, and the first drain electrode 175a form the first thin film transistor T1 together with the first semiconductor pattern 153a, and a channel of the first thin film transistor T1 is formed on the first semiconductor pattern 153a between the first source electrode 173a and the first drain electrode 175a. Similarly, the second gate electrode 123b, the second source electrode 173b, and the second drain electrode 175b form the second thin film transistor T2 together with the second semiconductor pattern 153b, and a channel of the second thin film transistor T2 is formed on the second semiconductor pattern 153b between the second source electrode 173b and the second drain electrode 175b. Further, the third gate electrode 123c, the third source electrode 173c, and the third drain electrode 175c form the third thin film transistor T3 together with the third semiconductor pattern 153c, and a channel of the third thin film transistor T3 is formed on the third semiconductor pattern 153c between the third source electrode 173c and the third drain electrode 175c. The second drain electrode 175b may be connected to the third source electrode 173c.

The first source electrode 173a of the first thin film transistor T1 and the second source electrode 173b of the second thin film transistor T2 may be formed to surround the first drain electrode 175a and the second drain electrode 175b, respectively. The third source electrode 173c of the third thin film transistor T3 may be arranged in parallel to the third drain electrode 175c.

A passivation layer 181 is formed on the data conductor and the exposed semiconductor portion. In an exemplary embodiment, the passivation layer 181 is made of an inorganic insulating material such as, for example, silicon nitride or silicon oxide. In an exemplary embodiment, the passivation layer 181 is made of an organic insulating material, and the surface of the passivation layer 181 may be flat. When the passivation layer 181 is made of an organic insulating material, it may have photosensitivity, and its dielectric constant may be about equal to or lower than about 4.0.

The passivation layer 181 may have a double-layer structure including a lower inorganic layer and an upper organic layer, resulting in a passivation layer having an organic layer with desirable insulating characteristics that does not damage the exposed semiconductor portion.

On the passivation layer 181, a first contact hole 183a and a second contact hole 183b for exposing the first drain electrode 175a and the second drain electrode 175b are formed.

On the passivation layer 181 and the gate insulating film 141, a third contact hole 183c for exposing a part of the reference electrode 133c and a part of the third drain electrode 175c is formed, and the third contact hole 183c is covered by a connection member 193. The connection member 193 electrically connects the reference electrode 133c and the third drain electrode 175c, which are exposed through the third contact hole 183c, to each other.

On the passivation layer 181, a pixel electrode, which includes a first sub-pixel electrode 191a and a second sub-pixel electrode 191b, is formed. The pixel electrode may be made of a transparent conductive material such as, for example, ITO or IZO, or a reflective metal such as, for example, aluminum, silver, chrome, or an alloy thereof.

The first sub-pixel electrode 191a and the second sub-pixel electrode 191b are disposed relative to each other in a column direction. Each of the sub-pixel electrodes 191a and 191b may have a rectangular shape, and include a cross trunk portion that is composed of a horizontal trunk portion and a vertical trunk portion that is orthogonal to the horizontal trunk portion. Further, each of the first sub-pixel electrode 191a and the second sub-pixel electrode 191b is divided into four sub-regions by means of the horizontal trunk portion and the vertical trunk portion, and each of the sub-regions includes a plurality of fine branch portions.

One of the fine branch portions of the first sub-pixel electrode 191 and the second sub-pixel electrode 191b is diagonally spread in an upper left direction from the horizontal trunk portion or the vertical trunk portion, and the other of the fine branch portions thereof is diagonally spread in an upper right direction from the horizontal trunk portion or the vertical trunk portion. Further, one of the fine branch portions of the first sub-pixel electrode 191 and the second sub-pixel electrode 191b is diagonally spread in a lower left direction from the horizontal trunk portion or the vertical trunk portion, and the other of the fine branch portions thereof is diagonally spread in a lower right direction from the horizontal trunk portion or the vertical trunk portion.

For example, the respective fine branch portions may form an angle of about 45 degrees or about 135 degrees with the gate line 121 or the horizontal trunk portion. Further, the fine branch portions of the two neighboring sub-regions may be orthogonal to each other.

The width of each of the fine branch portions may become wider as the fine branch portion gets closer to the horizontal trunk portion or the vertical trunk portion.

The first sub-pixel electrode 191a and the second sub-pixel electrode 191b are physically and electrically connected to the first drain electrode 175a and the second drain electrode 175b through the contact holes 183a and 183b, and receive the data voltages from the first drain electrode 175a and the second drain electrode 175b. A portion of the data voltage that is applied to the second drain electrode 175b is divided through the third source electrode 173c, and the level of the voltage that is applied to the first sub-pixel electrode 191a becomes higher than the level of the voltage that is applied to the second sub-pixel electrode 191b.

In an exemplary embodiment, the level of the voltage that is applied to the reference voltage line 131 is higher than the level of the common voltage that is applied to the common electrode 221, and the difference between their absolute values is about 1V to about 4V. For example, if the common voltage Vcom is about 7V, the reference voltage Vr is about 8V to about 11V.

A color filter and a light blocking member may be formed on the lower display substrate 100. The light blocking member may be formed on a center portion in which the first to third thin film transistors T1, T2, and T3 are arranged (e.g., on the thin film transistor region and the data line 171). The color filter is disposed in a region that is surrounded by the light blocking member, and may be formed along the pixel electrode.

The upper display substrate 200 will be described herein.

The upper display substrate 200 includes a second substrate 211 and a common electrode 221. The common electrode 221 is formed on the second substrate 211, and the second substrate 211 is made of, for example, transparent glass or plastic.

Alignment layers may be formed on both surfaces of the lower display substrate 100 and the upper display substrate 200. The alignment layers may be, for example, vertical alignment layers.

Polarizers are provided on outer surfaces of the display substrates 100 and 200. The polarizing axes of the two polarizers may be orthogonal to each other, and one of the polarizing axes may be parallel to the gate line 121. In an exemplary embodiment (e.g., in the case of a reflective display device), one of the two polarizers may be omitted.

The liquid crystal layer 300 disposed between the two display substrates 100 and 200 includes liquid crystal molecules 311 having negative dielectric anisotropy. The liquid crystal molecules 311 of the liquid crystal layer 300 may be pretilted such that the long axis of the molecules 311 is substantially parallel to the length direction of the fine branch portions of the first sub-pixel electrode 191a and the second sub-pixel electrode 191b (e.g., parallel to the diagonal direction in which the fine branch portions extend), and may be arranged to be vertical to the surfaces of the two display substrates 100 and 200. The liquid crystal layer 300 may further include optical polymers, and the liquid crystal molecules 311 may be pretilted through the optical polymers such that the long axis of the molecules 311 is substantially parallel to the length direction of the fine branch portions of the first sub-pixel electrode 191a and the second sub-pixel electrode 191b (e.g., parallel to the diagonal direction in which the fine branch portions extend).

The first sub-pixel electrode 191a and the second sub-pixel electrode 191b, to which the data voltages are applied, generate an electric field together with the common electrode 221, to which the common voltage is applied, and determine the tilt direction of the liquid crystal molecules 311 of the liquid crystal layer 300. Polarization of light that passes through the liquid crystal layer 300 may differ according to the tilt direction of the liquid crystal molecules 311 as determined above. The first sub-pixel electrode 191a, the second sub-pixel electrode 191b, and the common electrode 221 form the first liquid crystal capacitor Clc_H and the second liquid crystal capacitor Clc_L, and retain the applied voltage after the thin film transistor is turned off. At this time, the sides of the fine branch portion distort the electric field to produce a horizontal component that is vertical to the side of the fine branch portion, and the tilting direction of the liquid crystal molecules 311 is determined as the direction that is determined by the horizontal component. Accordingly, the liquid crystal molecules 311 may be firstly tilted in the direction that is vertical to the side of the fine branch portion. However, since the horizontal component of the electric field that is caused by the side of the neighboring fine branch portion has an opposite direction and a gap between the fine branch portions is narrow, the liquid crystal molecules 311, which intend to be tilted in the opposite directions, are tilted together in the direction that is parallel to the length direction of the fine branch portion (e.g., parallel to the diagonal direction in which the fine branch portion extends).

In an exemplary embodiment of the present invention, since the fine branch portions of one pixel are spread in four directions, the liquid crystal molecules 311 are also tilted in four directions. When the liquid crystal molecules 311 are tilted in various directions, a reference viewing angle of the display device may be increased.

Figure 7:
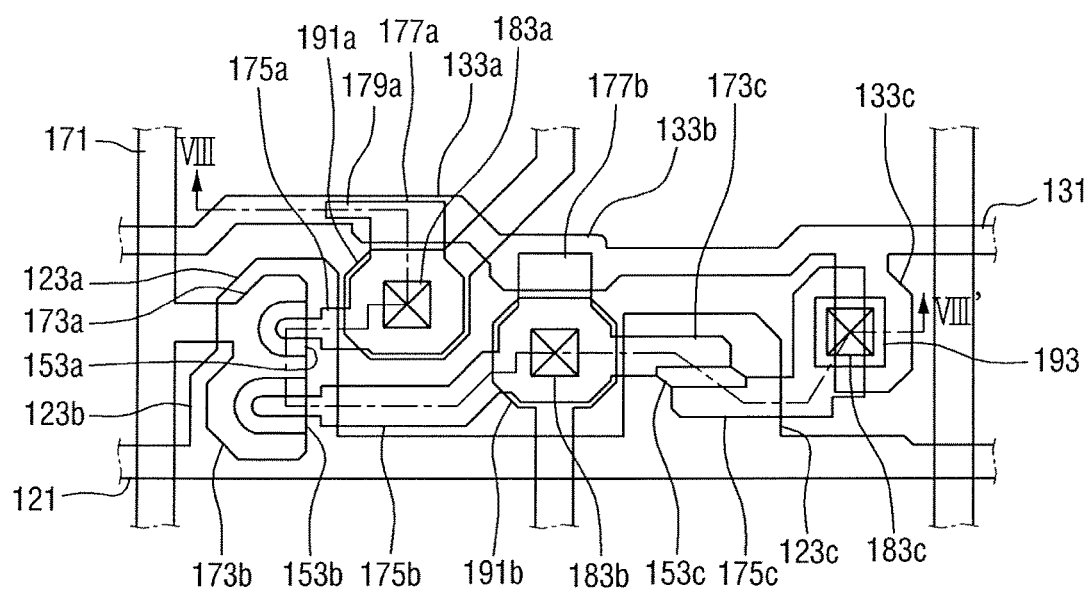
FIG. 7 is an enlarged plan view of a thin film transistor region of one pixel positioned in region B of the display device of FIG. 1, according to an exemplary embodiment of the present invention.
Figure 8:
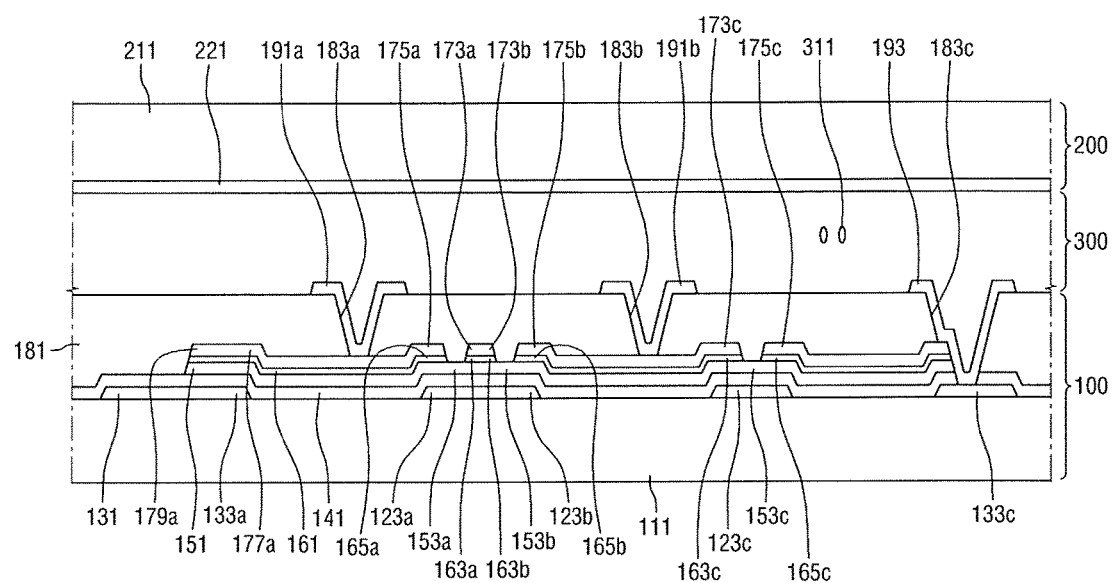
FIG. 8 is a cross-sectional view taken along line VIII-VIII' of FIG. 7, according to an exemplary embodiment of the present invention.

Herein, one pixel that is positioned in region B of the display device of FIG. 1 will be described in detail. FIG. 7 is an enlarged plan view of a thin film transistor region of one pixel positioned in region B of the display device of FIG. 1. FIG. 8 is a cross-sectional view taken along line VIII-VIII' of FIG. 7. For convenience of explanation, the same reference numerals may be used for elements that are substantially the same as elements previously described with reference to FIGS. 4 to 6, and further description of these elements may be omitted.

Referring to FIGS. 7 and 8, in one pixel that is positioned in region B of the display device of FIG. 1, a first drain extension portion 177a may include a projection extension portion 179a. The first drain extension portion 177a may include, for example, a body portion and the projection extension portion 179a which projects and extends from the body portion. Accordingly, an area of a region in which the first drain extension portion 177a and the first holding electrode 133a overlap each other may be increased. As a result, the capacitance of the first holding capacitor Ccst_H may be increased.

In contrast, an area of a region in which a second drain extension portion 177b and a second holding electrode 133b overlap each other may be about equal to that of region A. As a result, the capacitance of the second holding capacitor Ccst_L may be unchanged.

Accordingly, the area of the region in which the first drain extension portion 177a and the first holding electrode 133a overlap each other may be larger than the area of the region in which the second drain extension portion 177b and the second holding electrode 133b overlap each other. As a result, the capacitance of the first holding capacitor Ccst_H may be higher than the capacitance of the second holding capacitor Ccst_L.

Figure 9:
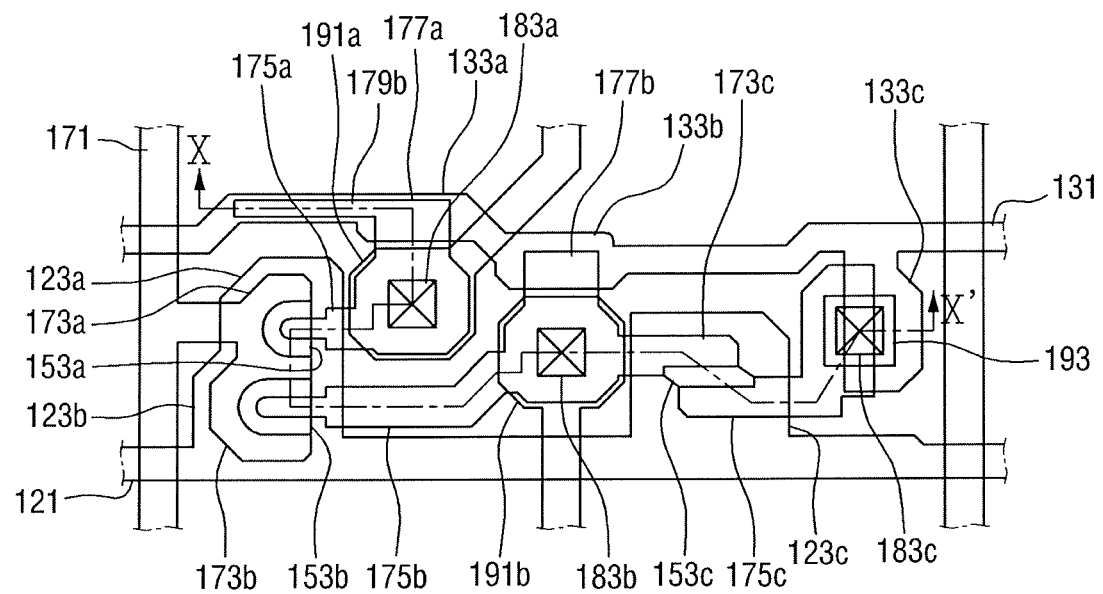
FIG. 9 is an enlarged plan view of a thin film transistor region of one pixel positioned in region C of the display device of FIG. 1, according to an exemplary embodiment of the present invention.
Figure 10:
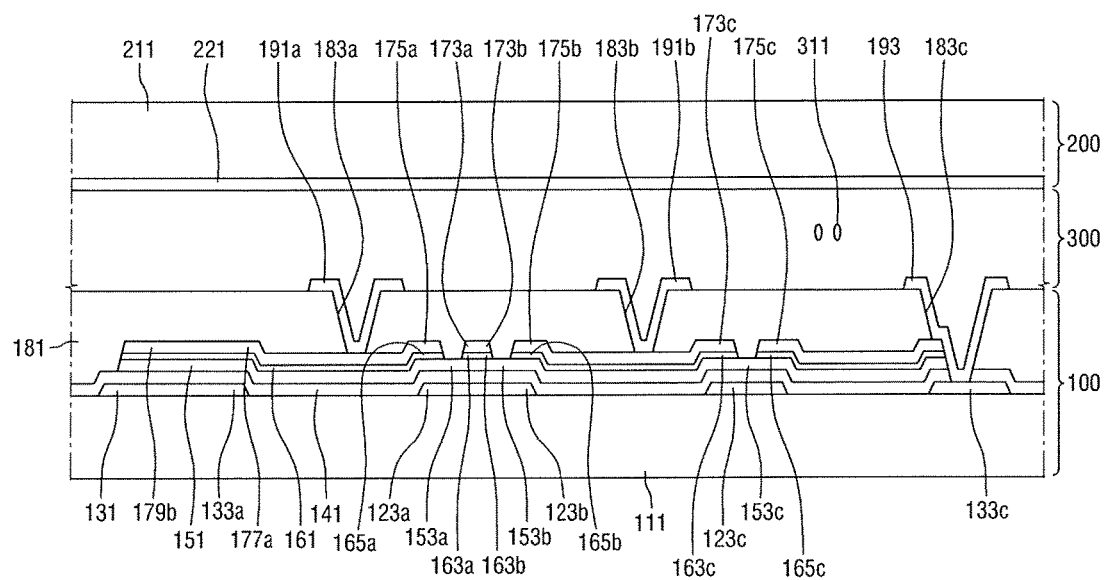
FIG. 10 is a cross-sectional view taken along line X-X' of FIG. 9, according to an exemplary embodiment of the present invention.

Herein, one pixel that is positioned in region C of the display device of FIG. 1 will be described in detail. FIG. 9 is an enlarged plan view of a thin film transistor region of one pixel positioned in region C of the display device of FIG. 1. FIG. 10 is a cross-sectional view taken along line X-X' of FIG. 9. For convenience of explanation, the same reference numerals may be used for elements that are substantially the same as elements previously described with reference to FIGS. 4 to 8, and further description of these elements may be omitted.

Referring to FIGS. 9 and 10, in one pixel that is positioned in region C of the display device of FIG. 1, the length of the projection extension portion 179b of the first drain extension portion 177a may be further increased. That is, the length of the projection extension portion 179b of region C may be longer than the length of the projection extension portion 179a of region B of the display device of FIG. 1. As a result, the capacitance of the first holding capacitor Ccst_H may be further increased.

In contrast, the area of a region in which a second drain extension portion 177b and a second holding electrode 133b overlap each other may be about equal to that of region A or B. As a result, the capacitance of the second holding capacitor Ccst_L may be unchanged.

Accordingly, the area of the region in which the first drain extension portion 177a and the first holding electrode 133a overlap each other may be larger than the area of the region in which the second drain extension portion 177b and the second holding electrode 133b overlap each other. As a result, the capacitance of the first holding capacitor Ccst_H may be higher than the capacitance of the second holding capacitor Ccst_L.

As described above, comparing regions A, B, and C of the display device of FIG. 1 with each other, the area of the region in which the first drain extension portion 177a and the first holding electrode 133a overlap each other may be increased as going from region A to region C. That is, the area of the region in which the first drain extension portion 177a and the first holding electrode 133a overlap each other may be increased as going in the direction of the gate driver GD (e.g., the area in which an overlap occurs increases in a direction toward the gate driver GD).

In contrast, the areas of the regions in which the second drain extension portion 177b and the second holding electrode 133b overlap each other may be about equal to each other in regions A, B, and C, and also on the whole surface of the first substrate 111. That is, the shapes of the second drain extension portion 177b and the second holding electrode 133b may be the same on the whole surface of the first substrate 111.

Accordingly, the difference between the area of the region in which the first drain extension portion 177a and the first holding electrode 133a overlap each other, and the area of the region in which the second drain extension portion 177b and the second holding electrode 133b overlap each other, may become greater as going from region A to region C. That is, the difference between the area of the region in which the first drain extension portion 177a and the first holding electrode 133a overlap each other, and the area of the region in which the second drain extension portion 177b and the second holding electrode 133b overlap each other, may become greater as going in the direction of the gate driver GD (e.g., the area in which the overlap occurs increases in a direction toward the gate driver GD).

In general, a gate signal delay phenomenon may occur in a display device. For example, although a gate signal of a square waveform is applied to a pixel that is adjacent to the gate driver, the gate signal may be delayed in a pixel that is far apart from the gate driver. As a result, the waveform of the gate signal may be changed. For example, the gate signal that is applied to a pixel that is far apart from the gate driver may not be the same as the gate signal that is applied to a pixel that is closer to the gate driver.

As a result of the difference between the waveforms of the gate signal, an optimum common voltage of a pixel that is adjacent to the gate driver may be different from an optimum common voltage of a pixel that is far apart from the gate driver. For example, referring to a pixel that is far apart from the gate driver, the kickback voltage may be decreased due to a compensation current that is caused by the gate signal delay phenomenon. In particular, a negative kickback voltage may be greatly decreased. Accordingly, the optimum common voltage of a pixel that is far apart from the gate driver may become relatively higher than the optimum common voltage of a pixel that is adjacent to the gate driver.

On the other hand, in a mode in which both a pair of sub-pixels operate in the case of displaying a high-gradation image, and only one of the pair of sub-pixels operate in the case of displaying a low-gradation image, the common voltage is set based on the case in which the high-gradation image is displayed. That is, the common voltage may be set to be lower than the optimum common voltage in the case in which the low-gradation image is displayed.

If a low common voltage is set, the set common voltage becomes close to the optimum common voltage of the pixel that is adjacent to the gate driver. That is, a difference occurs between the set common voltage and the optimum common voltage of the pixel that is far apart from the gate driver. As a result, the luminance of a pixel that is far apart from the gate driver becomes relatively higher than the luminance of a pixel that is adjacent to the gate driver due to the asymmetry between the positive polarity and the negative polarity. That is, a difference occurs in luminance between a pixel that is adjacent to the gate driver and a pixel that is far apart from the gate driver.

Referring again to FIGS. 1 to 3, factors that exert the greatest influence on the kickback voltage are parasitic capacitors Cgs1, Cgs2, and Cgs3. Comparing their levels with each other, their levels are in the order of Cgs1, Cgs2, and Cgs3. That is, the kickback voltage Vkb_L of the second sub-pixel Px2, to which a relatively low voltage is applied, becomes higher than the kickback voltage Vkb_H of the first sub-pixel Px1, to which a relatively high voltage is applied. Since both the first sub-pixel Px1 and the second sub-pixel Px2 operate in the case of displaying the high-gradation image, and only the first sub-pixel Px1 operates in the case of displaying the low-gradation image, the kickback voltage in the case of displaying the high-gradation image becomes much higher than the kickback voltage in the case of displaying the low-gradation image. At this time, if the common voltage is set based on the case in which the high-gradation image is displayed, the common voltage is set to a very low value. As a result, the difference in luminance between a pixel that is adjacent to the gate driver GD and a pixel that is far apart from the gate driver GD becomes greater.

In the display device according to exemplary embodiments of the present invention, the area of the region in which the first drain extension portion 177a and the first holding electrode 133a overlap each other is increased as going in the direction of the gate driver GD. As a result, the difference in kickback voltage between the region that is adjacent to the gate driver GD and the region that is far apart from the gate driver GD is decreased, and the occurrence of the difference in luminance between the region that is adjacent to the gate driver GD and the region that is far apart from the gate driver GD may be reduced or prevented. That is, through reduction of the difference in kickback voltage between the region that is adjacent to the gate driver GD and the region that is far apart from the gate driver GD, the optimum common voltage of the region that is adjacent to the gate driver GD may become substantially equal to the optimum common voltage of the region that is far apart from the gate driver GD, and the common voltage may be set to match the optimum common voltage to prevent the occurrence of the difference in luminance between the region that is adjacent to the gate driver GD and the region that is far apart from the gate driver GD. In particular, through adjustment of the first holding capacitor Ccst_H of the first sub-pixel Px1 for each region, the occurrence of the luminance difference between the regions can be reduced or prevented in the case of displaying a high-gradation image and in the case of displaying a low-gradation image.

For example, region A and region C shown in FIG. 1 may be compared with each other as follows. It is assumed that the kickback voltage of region A is Vkb_HA, and the kickback voltage of region C is Vkb_HC. Further, it is assumed that the first holding capacitor of region A is Ccst_HA, and the first holding capacitor of region C is Ccst_HC. Further, it is assumed that the change amount of the gate signal is ΔVg. If it is assumed that the remaining variables are the same in region A and region C, the kickback voltages Vkb_HA and Vkb_HC in region A and region C are as follows (the following equations do not reflect the gate signal delay phenomenon):

$$\text{Vkb\_HA} = \frac{Cgs1}{\text{Clc\_H} + \text{Cds\_H} + Cgs1 + \text{Ccst\_HA}} \times \Delta Vg$$

$$\text{Vkb\_HC} = \frac{Cgs1}{\text{Clc\_H} + \text{Cds\_H} + Cgs1 + \text{Ccst\_HC}} \times \Delta Vg$$

At this time, since the level of Ccst_HC becomes higher than the level of Ccst_HA as a result of the projection extension portion 179b, the kickback voltage Vkb_HC in region C that is adjacent to the gate driver GD becomes decreased for a predetermined level. Accordingly, the kickback voltage Vkb_HC in region C becomes substantially equal to the kickback voltage Vkb_HA in region A in which the kickback voltage is decreased for a predetermined level due to the gate signal delay phenomenon. That is, the difference between the kickback voltages according to the regions is decreased, and thus, the luminance difference according to the regions is decreased.

Figure 11:
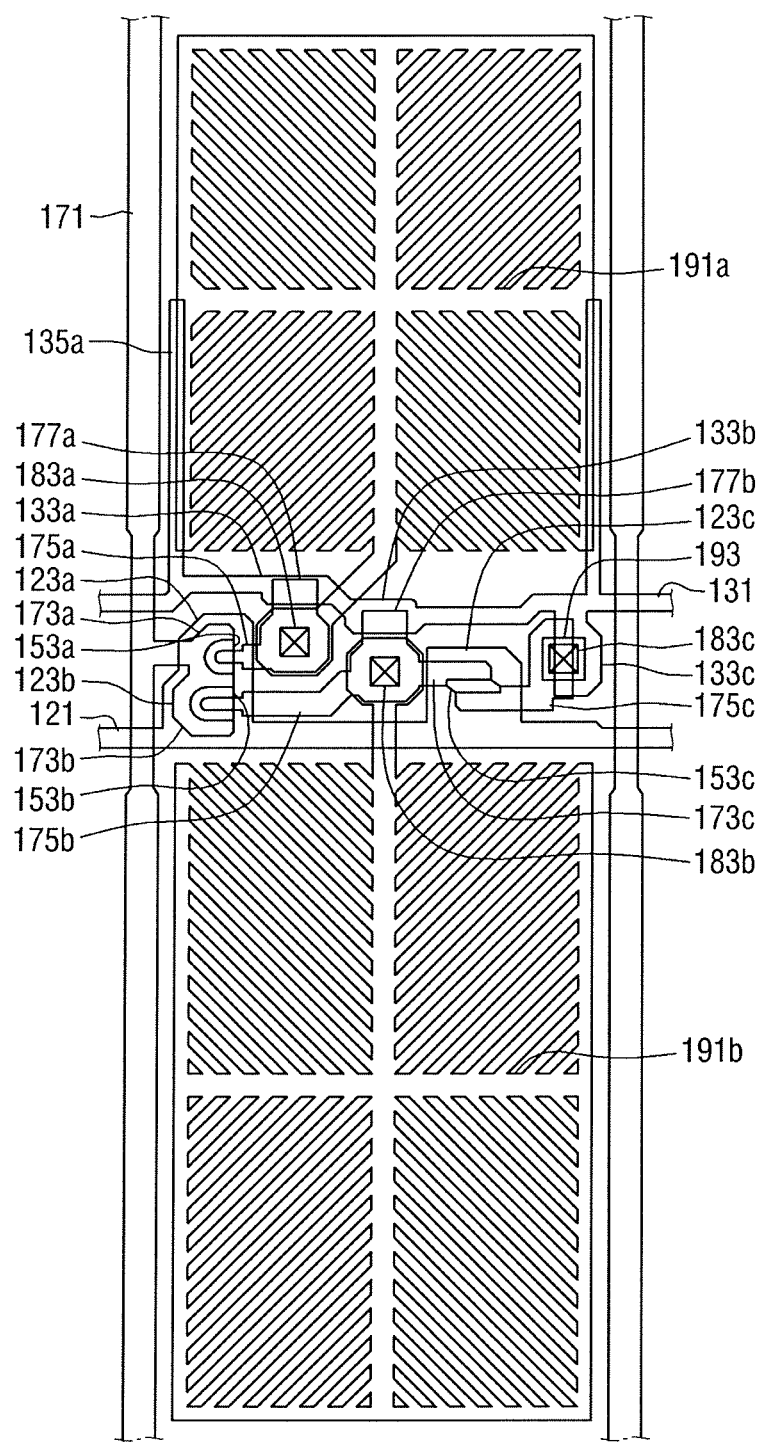
FIG. 11 is a plan view of one pixel in a display device that is arranged in a position that corresponds to region A of FIG. 1, according to an exemplary embodiment of the present invention.
Figure 12:
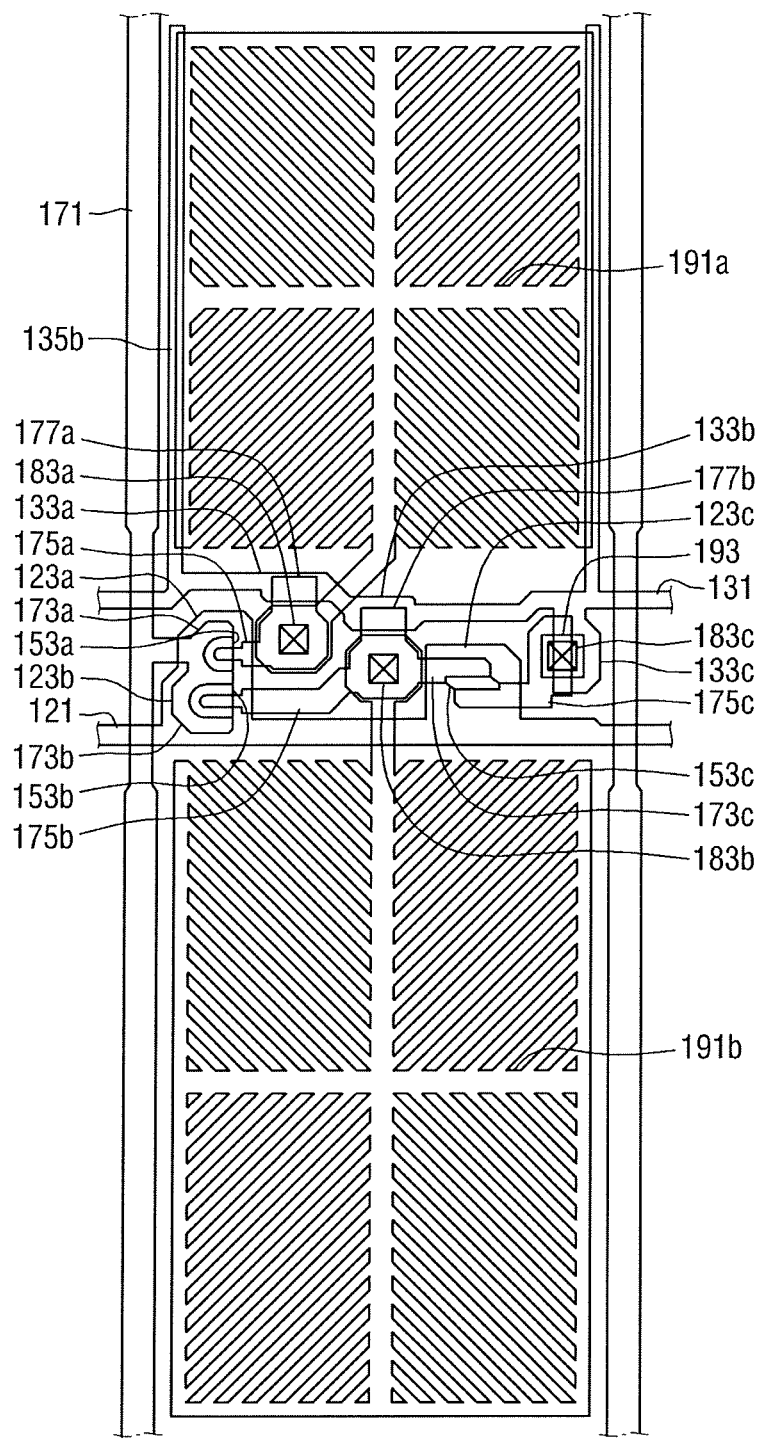
FIG. 12 is a plan view of one pixel that is arranged in a position that corresponds to region B of FIG. 1 in the display device of FIG. 11, according to an exemplary embodiment of the present invention.
Figure 13:
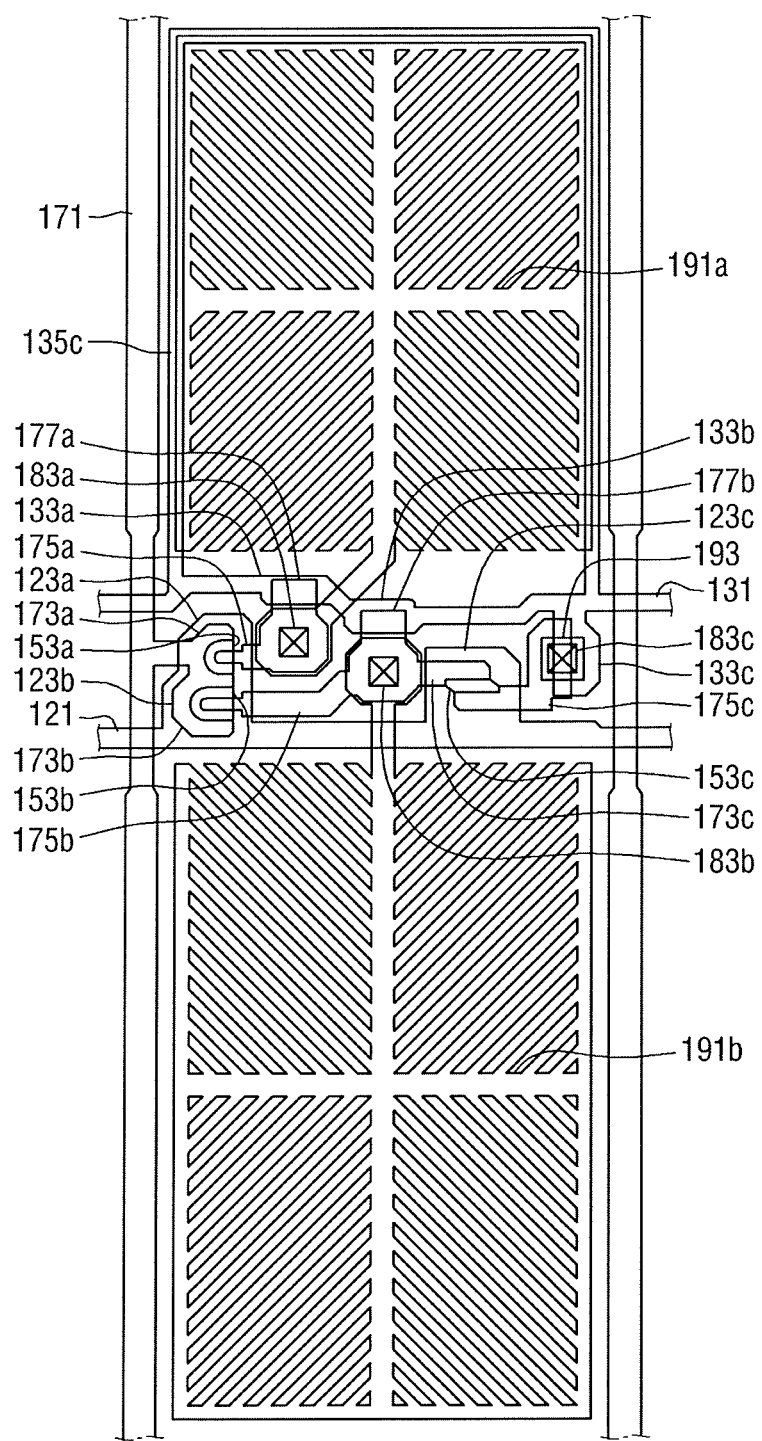
FIG. 13 is a plan view of one pixel that is arranged in a position that corresponds to region C of FIG. 1 in the display device of FIG. 11, according to an exemplary embodiment of the present invention.

Hereinafter, a display device according to an exemplary embodiment of the present invention will be described with reference to FIGS. 11 to 13. FIG. 11 is a plan view of one pixel in a display device that is arranged in a position that corresponds to region A of FIG. 1. FIG. 12 is a plan view of one pixel that is arranged in a position that corresponds to region B of FIG. 1 in the display device of FIG. 11. FIG. 13 is a plan view of one pixel that is arranged in a position that corresponds to region C of FIG. 1 in the display device of FIG. 11. For convenience of explanation, the same reference numerals may be used for elements that are substantially the same as the elements illustrated in FIG. 4, and further description of these elements may be omitted.

First, referring to FIG. 11, a reference voltage line 131 of one pixel that is arranged in a position corresponding to region A of FIG. 1 may include a holding extension portion 135a. The holding extension portion 135a may overlap a part of a first sub-pixel electrode 191a. For example, the holding extension portion 135a may overlap a part of edge portions on both sides of the first sub-pixel electrode 191a. As described above, the holding extension portion 135a may overlap the first sub-pixel electrode 191a to form a holding capacitor. The holding capacitor may be a part of the first holding capacitor Ccst_H (see FIG. 2).

Next, referring to FIG. 12, the length of a holding extension portion 135b of one pixel that is arranged in a position corresponding to region B of FIG. 1 may be increased in comparison to the holding extension portion 135a of FIG. 11. That is, the capacitance of the holding capacitor that is formed by the holding extension portion 135b and the first sub-pixel electrode 191a may be further increased.

Next, referring to FIG. 13, a holding extension portion 135c of one pixel that is arranged in a position corresponding to region C of FIG. 1 may surround both sides of the first sub-pixel electrode 191a, as well as an upper side thereof. As a result, the capacitance of the holding capacitor that is formed by the holding extension portion 135c and the first sub-pixel electrode 191a may be further increased.

As described above, by changing the capacitance of the first holding capacitor Ccst_H for each region, the difference in luminance between the regions can be prevented or reduced.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display device, comprising:
a first substrate;
a plurality of pixel regions positioned on the first substrate, wherein each pixel region comprises:
a gate line disposed on the first substrate and connected to a gate driver;
a reference voltage line disposed on the first substrate;
a data line disposed on the first substrate, wherein the data line crosses the gate line and the reference voltage line;
a first thin film transistor comprising a first drain electrode, wherein the first thin film transistor is connected to the gate line and the data line;
a second thin film transistor comprising a second drain electrode;
a third thin film transistor connected to the gate line, the reference voltage line, and the second thin film transistor; and
a pixel electrode comprising a first sub-pixel electrode connected to the first thin film transistor and a second sub-pixel electrode connected to the second thin film transistor,
wherein the first drain electrode overlaps the reference voltage line, and
wherein an area in which the first drain electrode and the reference voltage line overlap each other in each pixel region increases as the pixel regions are positioned closer to the gate driver.

2. The display device of claim 1, wherein the second drain electrode overlaps the reference voltage line, and
the area in which the first drain electrode and the reference voltage line overlap each other is about equal to or larger than an area in which the second drain electrode and the reference voltage line overlap each other.

3. The display device of claim 2, wherein the area in which the second drain electrode and the reference voltage line overlap each other is constant on an entire surface of the first substrate.

4. The display device of claim 1, wherein the second drain electrode overlaps the reference voltage line, and
a difference between the area in which the first drain electrode and the reference voltage line overlap each other in each pixel region and an area in which the second drain electrode and the reference voltage line overlap each other in each pixel region increases as the pixel regions are positioned closer to the gate driver.

5. The display device of claim 1, wherein the first drain electrode comprises a first drain extension portion that overlaps the reference voltage line,
the first drain extension portion comprises a projection extension portion, and
a length of the projection extension portion in each pixel region increases as the pixel regions are positioned closer to the gate driver.

6. The display device of claim 5, wherein the second drain electrode comprises a second drain extension portion that overlaps the reference voltage line, and
the second drain extension portion has a same shape on an entire surface of the first substrate.

7. The display device of claim 1, wherein the gate line and the reference voltage line are disposed on a same plane.

8. The display device of claim 1, wherein an output terminal of the second thin film transistor is connected to the second sub-pixel electrode and an input terminal of the third thin film transistor.

9. The display device of claim 1, wherein a voltage applied to the second sub-pixel electrode is lower than a voltage applied to the first sub-pixel electrode.

10. The display device of claim 9, wherein an area of the second sub-pixel electrode is about equal to or larger than an area of the first sub-pixel electrode.

11. The display device of claim 1, wherein the first sub-pixel electrode and the second sub-pixel electrode each comprise:
a cross trunk portion comprising a horizontal trunk portion and a vertical trunk portion that crosses the horizontal trunk portion; and
a plurality of fine branch portions extending from the cross trunk portion.

12. The display device of claim 1, further comprising:
a second substrate facing the first substrate; and
a liquid crystal layer interposed between the first substrate and the second substrate.

13. A display device, comprising:
a substrate;
a plurality of pixel regions positioned on the substrate, wherein each pixel region comprises:
a gate line disposed on the substrate and configured to receive a gate signal from a gate driver;
a reference voltage line disposed on the substrate and spaced apart from the gate line;
a data line disposed on the substrate and configured to receive a data signal from a data driver, wherein the data line crosses the gate line and the reference voltage line;

a first thin film transistor connected to the gate line and the data line;
a second thin film transistor connected to the gate line and the data line;
a third thin film transistor connected to the gate line, the reference voltage line, and the second thin film transistor; and
a pixel electrode comprising a first sub-pixel electrode connected to the first thin film transistor and a second sub-pixel electrode connected to the second thin film transistor,
wherein the first sub-pixel electrode overlaps the reference voltage line, and
wherein an area in which the first sub-pixel electrode and the reference voltage line overlap each other in each pixel region increases as the pixel regions are positioned closer to the gate driver.

14. The display device of claim 13, wherein the reference voltage line comprises a holding extension portion that overlaps an edge portion of the first sub pixel electrode, and
a length of the holding extension portion in each pixel region increases as the pixel regions are positioned closer to the gate driver.

* * * * *